May 8, 1956  E. W. WEAVER  2,744,764
SPRING SUSPENSION FOR AN INDUSTRIAL LIFT TRUCK
Original Filed May 28, 1947  2 Sheets-Sheet 1
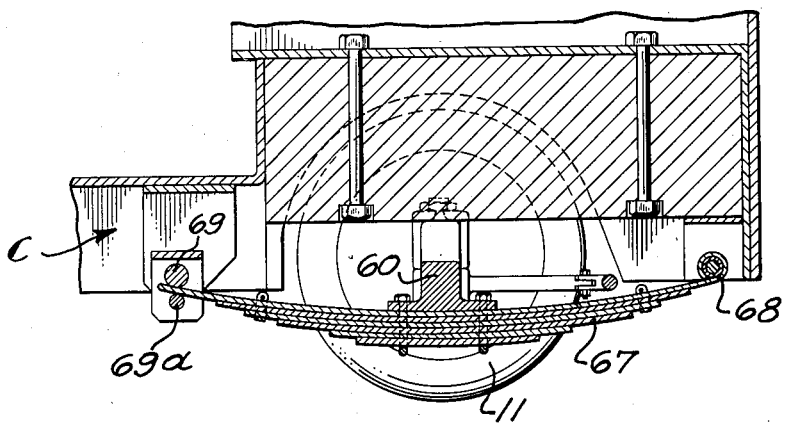
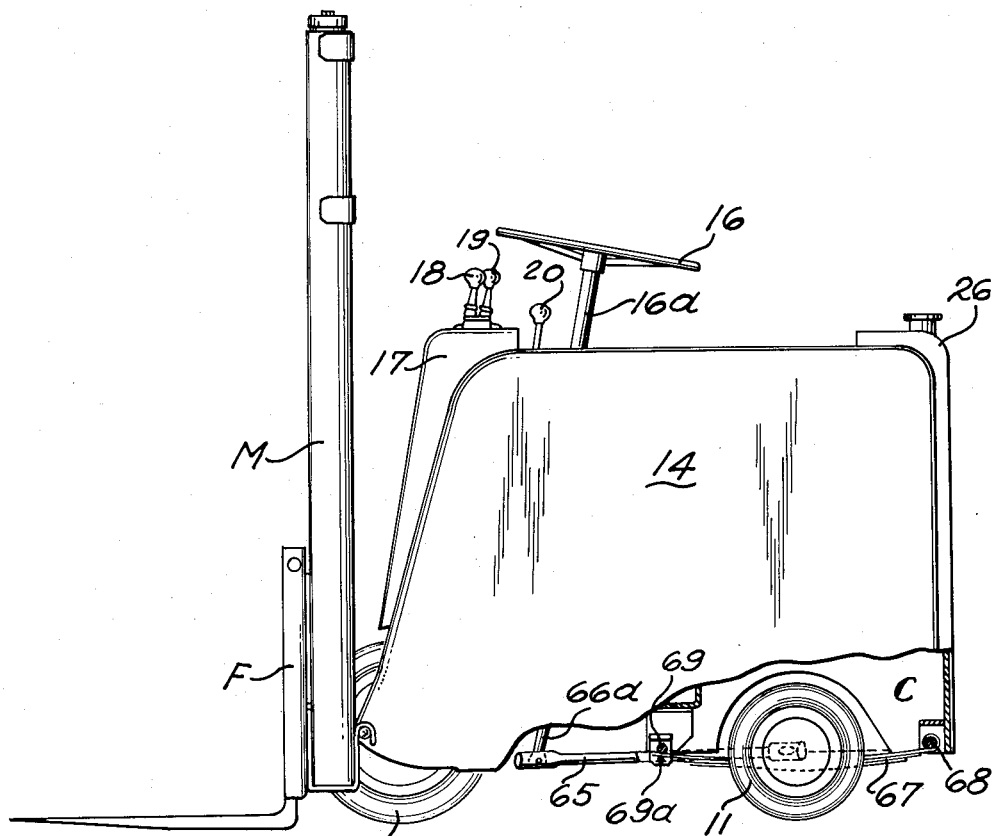
INVENTOR.
ELVERTON W. WEAVER
BY
RICHEY, WATTS, EDGERTON & McNENNY
ATTORNEYS

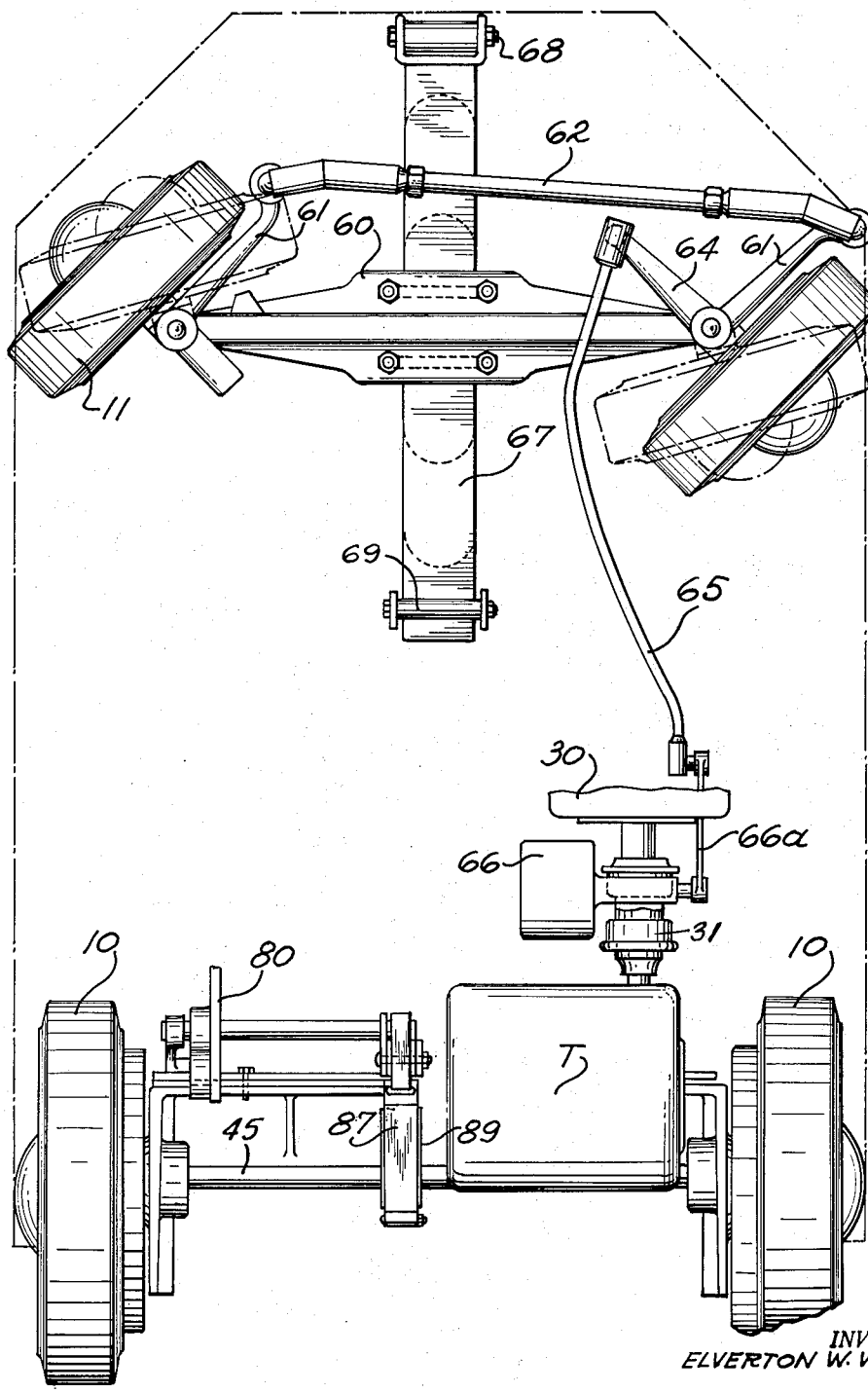

United States Patent Office 2,744,764
Patented May 8, 1956

2,744,764

SPRING SUSPENSION FOR AN INDUSTRIAL LIFT TRUCK

Elverton W. Weaver, Cleveland Heights, Ohio, assignor to Towmotor Corporation, Cleveland, Ohio, a corporation of Ohio Original application May 28, 1947, Serial No. 750,914, now Patent No. 2,625,285, dated January 13, 1953. Divided and this application July 12, 1952, Serial No. 298,543

2 Claims. (Cl. 280—112)

This invention relates broadly to industrial trucks and, more particularly, to improvements in vehicles of the type which are constructed for the transportation and elevation of material in and about industrial plants, loading docks and similar environs, this application being a division of my application entitled "Industrial Truck," filed May 28, 1947, Serial No. 750,914, Patent No. 2,625,285.

A particular object of this invention is to provide springing which will allow the short turning radius required to operate a vehicle of the lift truck type in close quarters, thus eliminating wide aisles and thereby increasing usable storage space.

Another object of this invention is to provide a single spring aligned with the longitudinal axis of the vehicle and connected to the center of the rear axle with the ends of said spring attached to said vehicle to allow greater freedom of individual movement of the rear wheels as the spring is twisted at its central portion by the transverse tilting of the rear axle.

The type of lift trucks wherein the operator is provided with a seat intermediate the front and rear wheels has offered a problem in the past in achieving the short turning radius which is essential in handling and stacking articles for storage in warehouses and the like. The provision of a conventional automotive type suspension system necessarily limits the maximum angularity at which the dirigible wheels may be turned to control the travel of the vehicle. In the present invention, such limitations have been overcome by the provision of a suspension arrangement which will not interfere with the dirigible wheels regardless of the angle at which the wheels are turned.

The vehicle is also constructed with a low-level, readily accessible driving platform, an arrangement of transmission and steering controls which will accommodate operation of the vehicle by the driver in either a standing or seated position, an organization of driving elements which will afford the operator maximum comfort and visibility, a chassis design which is compact and accessible, and a body structure which will permit the operator to perform a day's work with greater accuracy and dispatch and with less fatigue than possible with the machines heretofore constructed.

A single leaf spring is located on the centerline of the vehicle on which the rear axle is mounted allowing the dirigible wheels space in which to turn at nearly right angles to the centerline of the vehicle.

Although the foregoing description is necessarily of a detailed character in order that the invention may be completely set forth it is to be understood that the specific terminology is not intended to be restrictive or confining, and that various rearrangements of parts and modifications of detail may be resorted to without departing from the scope or spirit of the invention as herein claimed.

In the drawings:

Fig. 1 is a side elevational view of a lift truck having parts of the body broken away to show the rear axle mounting assembly;

Fig. 2 is a vertical sectional view of a fragmentary portion of the rear axle and spring assembly;

Fig. 3 is a fragmentary plan view showing the dirigible wheels in an alternate position.

The frame of the vehicle as indicated generally at C supports a mast M which, in turn, supports a carriage and fork assembly F. The vehicle is driven by the wheels 10 and is steered by the rear wheels 11. As will be seen in Fig. 1, the engine and driving mechanism associated therewith are encased by a hood 14. The steering wheel 16 is disposed above the hood 14 which is apertured to receive the steering column 16a. A cowling 17 is provided to protect the fuel and oil tanks which are disposed therein. The gear shift levers 18 and 19 are mounted in the upper portion of the cowling 17 and the lever 20 mounted in the rear portion of the cowling 17 for controlling the hydraulic system.

The engine is mounted on the frame C along the side thereof. The power drive is transmitted from the engine to the front wheels of the vehicle through the propeller shaft clutch 30, universal joints 31 and the gear train in the transmission T. Since the engine may be of any conventional form, a detailed description thereof is deemed unnecessary herein. The radiator 26 and fan are mounted on the frame in the rearward portion of the body.

*Front wheel drive assembly*

The driving axle 45 interconnects the transmission gearing in the transmission case T and the front wheels 10. A brake shoe 87 is actuated into engagement with the brake drum 89 by the operation of the brake pedal 80. By operating the brake pedal 80, braking force is applied to the front wheels 10 to control the movement of the vehicle.

The steering gear casing 66 is mounted on the frame C in tontiguous relation to the engine and subjacent the medial axis of the crank shaft. The steering arm 66a which is operatively connected to the worm in the steering gear case is pivotally connected in the forward end of a drag link 65.

*Rear axle assembly*

The rear wheels 11 which constitute the steering wheels are mounted on stub shafts supported on the dead axle 60 in the manner customary in automotive practice. The steering knuckles 61 are integral with the stub shaft assemblies and are connected by tie rods 62. An arm 64 which is integral with the left steering knuckle connects the drag link 65 and stub axles in the usual manner.

The rear axle 60 is mounted upon a single centrally disposed leaf spring 67 which is pivoted to the frame at the rear thereof upon a pin 68. The forward end of the main leaf of the spring is slidably mounted between a pair of spaced pins 69 and 69a which function as a shackle for the forward portion of the spring. The provision of a single centrally located spring facilitates maximum turning movement of the steering wheels to increase the maneuverability of the vehicle. As will be seen in Fig. 3, the dirigible wheels may be turned to a position approaching a 90° angle with the straight-ahead position and maintain a substantial clearance with the spring suspension. The single spring further allows greater freedom of individual movement of the wheels, thus reducing shock to the vehicle which would be produced by unevenness in the surface over which the vehicle is traveling.

It is to be understood that the specific nature of the present disclosure is not intended to be restrictive or confining and that various rearrangements of parts and modifications of design may be resorted to without de-

What is claimed is:

1. In an industrial truck, a frame, a front axle and front drive wheels supporting the front end of the frame, a rear axle having dirigible wheels mounted at each side thereof, a tie rod operatively connecting said dirigible wheels for steering movement from a position normal to the axis of the axle to a position approaching parallelism with the axis of the axle, a single multiple leaf spring connected at its center portion to said rear axle at its center and normal thereto, said single spring and the longitudinal axis of said frame aligned in a vertical plane passing through the center of the rear axle and normal to said rear axle, said spring having a width substantially less than the minimum distance between the said rear wheels when said rear wheels are turned to a position approaching parallelism with the axis of said rear axle, said single spring connected at the ends thereof to horizontally disposed pins fixed on said frame, whereby said single spring is twisted between its said ends in response to transverse tilting of the rear axle about the said center thereof.

2. In an industrial truck, a frame, a front axle and front drive wheels supporting the front end of the frame, a rear axle having dirigible wheels mounted at each side thereof, a tie rod operatively connecting said dirigible wheels for steering movement from a position normal to the axis of the axle to a position approaching parallelism with the axis of the axle, a single multiple leaf spring connected at its center portion to said rear axle at its center and normal thereto, said single spring and the longitudinal axis of said frame aligned in a vertical plane passing through the center of the rear axle and normal to said rear axle, said spring having a width substantially less than the minimum distance between the said rear wheels when said rear wheels are turned to a position approaching parallelism with the axis of said rear axle, said single spring connected at one end thereof to a horizontally disposed pin fixed to the frame and at the other end thereof between horizontally disposed vertically spaced portions fixed to the frame to receive said other end of the spring.

References Cited in the file of this patent

UNITED STATES PATENTS

| | | |
|---|---|---|
| 606,611 | Weston | June 28, 1898 |
| 892,164 | King | June 30, 1908 |
| 2,187,197 | Dunham | Jan. 16, 1940 |
| 2,299,445 | Weaver | Oct. 20, 1942 |
| 2,372,549 | Chambers | Mar. 27, 1945 |